United States Patent [19]

Rice et al.

[11] Patent Number: 5,164,345

[45] Date of Patent: Nov. 17, 1992

[54] AL$_2$O$_3$/B$_4$C/SIC COMPOSITE

[75] Inventors: Roy W. Rice, Alexandria, Va.; Leonard E. Dolhert, Clarksville; Jack H. Enloe, Columbia, both of Md.

[73] Assignee: W.R. Grace & Co.-Conn., New York, Conn.

[21] Appl. No.: 674,830

[22] Filed: Mar. 21, 1991

[51] Int. Cl.$^5$ .............................................. C04B 35/56
[52] U.S. Cl. ........................................ 501/91; 501/89; 501/90; 501/127; 501/128; 423/345; 423/439
[58] Field of Search ...................... 501/89, 90, 91, 127, 501/128; 423/345, 439

[56] References Cited

U.S. PATENT DOCUMENTS

| | | | |
|---|---|---|---|
| 4,213,883 | 7/1980 | Owens | 252/478 |
| 4,248,752 | 2/1981 | Myles | 260/29.1 R |
| 4,504,411 | 3/1985 | Sakai et al. | 252/506 |
| 4,601,848 | 7/1986 | Sakai et al. | 252/503 |
| 4,642,218 | 2/1987 | Rice | 419/11 |
| 4,745,091 | 5/1988 | Landingham | 501/89 |
| 4,804,642 | 2/1989 | Ray | 501/89 |
| 4,814,127 | 3/1989 | Toyoda | 264/56 |
| 4,879,262 | 11/1989 | Halverson et al. | 501/87 |
| 4,891,341 | 1/1990 | Cutler et al. | 501/89 |
| 4,919,991 | 4/1990 | Gadkaree | 428/113 |

*Primary Examiner*—Mark L. Bell
*Assistant Examiner*—Deborah Jones
*Attorney, Agent, or Firm*—Steven Capella

[57] ABSTRACT

The processes of the invention involve the formation of an initial reactant mixture by combining sources of SiO$_2$, B$_2$O$_3$, aluminum, and carbon. The mixture may then optionally be shaped or compacted. The reactant mixture is then heated to start a reaction which is described by the formula:

$$4\,C + 3\,SiO_2 + 2\,B_2O_3 + 8\,Al \rightarrow 4\,Al_2O_3 + B_4C + 3\,SiC.$$

Depending on the actual reactant mixture compositions and reaction conditions, other reactions may also occur.

8 Claims, No Drawings

AL₂O₃/B₄C/SIC COMPOSITE

This invention was made with Government support under Contract N00014-87-C-0515 awarded by the Office of Naval Research, Dept. of the Navy. The Government has certain rights in the invention.

BACKGROUND OF THE INVENTION

Structural ceramic materials generally show many advantages in high performance materials applications because of their high mechanical strength and hardness properties and low weight. These features make many of these ceramic materials attractive for use in military applications such as armor for vehicles. Numerous non-military applications for these materials are just beginning to be explored and implemented.

Unfortunately, a major disadvantage of most structural ceramic materials is high cost. High cost limits the use of these materials both in military and non-military applications.

The high cost of many structural ceramics may be partly attributed to high cost of the starting ceramic powders which are to be shaped and densified to form structural ceramic parts. The starting powders are often made by energy-intensive processes or by other expensive methods adapted to produce high purity starting powders. Generally, it has been preferred to minimize the impurity contents of starting powders in order to maximize the performance of the ultimate ceramic part.

Some prior art processes have used chemical reactions in the formation of ceramic composites. In U.S. Pat. No. 4,879,262, $B_4C$-$TiB_2$ composites were prepared by forming a powder compact containing B, C, and Ti or hydride or oxide powders thereof. The mixture was then combusted to yield a $B_4C$-$TiB_2$. The reactants used in that process still entail substantial cost. Moreover, there is no apparent disclosure in the prior art showing the production of $Al_2O_3$-SiC-$B_4C$ composites which have advantageous properties for armor applications.

Needless to say, it would be highly desirable to reduce these costs associated with structural ceramics. Indeed, reduction of cost is necessary if structural ceramics are to be used in broader non-military applications.

SUMMARY OF THE INVENTION

The present invention overcomes some of these problems of high cost structural ceramics. Namely, the invention encompasses the production of certain ceramic compositions and sintered ceramics containing $Al_2O_3$, $B_4C$ and SiC using low cost starting materials.

In one aspect, the invention encompasses a method of producing a composition $Al_2O_3$, $B_4C$ and SiC, the method comprising:
 (a) combining sources of $SiO_2$, $B_2O_3$, Al, and C to form a mixture, and
 (b) heating the mixture whereby the sources react to form $Al_2O_3$, $B_4C$ and SiC.

In a further aspect, the invention encompasses a method of producing a dense material containing $Al_2O_3$, $B_4C$ and SiC, the method comprising:
 (a) combining sources of $SiO_2$, $B_2O_3$, Al and C to form a mixture,
 (b) compacting the mixture into a shape,
 (c) heating the shape whereby the sources react to form $Al_2O_3$, $B_4C$ and SiC,
 (d) densifying the reacted shape.

The invention further encompasses ceramic compositions and dense ceramics containing $Al_2O_3$, $B_4C$ and SiC.

DETAILED DESCRIPTION OF THE INVENTION

The processes of the invention involve the formation of an initial reactant mixture by combining sources of $SiO_2$, $B_2O_3$, aluminum, and carbon. The mixture may then optionally be shaped or compacted. The reactant mixture is then heated to start a reaction which is described by the formula:

$$4C + 3\ SiO_2 + 2\ B_2O_3 + 8\ Al \rightarrow 4\ Al_2O_3 + B_4C + 3\ SiC.$$

Depending on the actual reactant mixture composition and reaction conditions, other reactions may also occur.

Once the mixture has been reacted to form a composition containing $Al_2O_3$, $B_4C$ and SiC, the mixture may then be densified to form a dense ceramic.

The reactant sources can be any sources which provide the desired elements or compounds for reaction and do not contain undesirable amounts of other elements or compounds. The $SiO_2$ source may be any conventional source such as sand, silica fume, silicic acid and the like. The boron oxide source is preferably boron oxide powder. Preferably, the boron oxide source has a low water content. The aluminum source is preferably aluminum metal powder. The carbon source may be a carbon powder (such as carbon black) or a carbonizable binder.

The initial reactant mixture proportions may be varied from the stoichiometry of the formula above. Additionally, other materials such as sintering aids or inert materials (e.g. fillers) may also be incorporated into the initial reactant mixture. A cermet may be formed by adding excess aluminum metal to the reactant mixture. Additionally, a volatilizable binder may be added to the reactant mixture to facilitate shaping of the mixture.

The reactants are preferably in powder form initially unless a carbonizable binder is used. The reactant powders may be mixed by any conventional technique such as dry milling or non-aqueous wet milling. The reactant mixture can be shaped or compacted using any conventional means.

The reactant mixture is then heated to initiate the desired reaction(s). The reaction(s) may be allowed to occur as part of a firing schedule leading ultimately to densification of the reaction products (i.e., $Al_2O_3$, $B_4C$ and SiC). Pressure may be applied to the mixture during said reaction. Preferably, such a firing schedule may allow sufficient time below the densification temperature to ensure substantial completion of the reaction prior to the densification.

Densification may be performed by any conventional technique such as hot pressing or pressureless sintering. In one preferred embodiment, the reactant mixture is loaded into a hot press die and allowed to react in situ in the hot press. The reacted composition would then be densified by hot pressing. Preferred hot pressing temperatures are at least about 1600° C. The preferred hot press pressure is at least about 1000 PSI, more preferably about 4000 PSI.

The following examples are provided merely to illustrate the invention. It should be understood that the invention is not limited to the reactants, process steps or results recited in the examples.

EXAMPLE 1

A powder mixture having stoichiometric proportions of $SiO_2$, $B_2O_3$, Al and C according to the formula above was prepared by ball milling the powders in isopropyl alcohol. The mixture was vacuum dried and passed through a 100 mesh screen.

The mixture was then hot pressed one hour under vacuum at 1600° C. and 4000 PSI. The desired reaction occurred during the heating to 1600° C. The resultant sintered ceramic had a strength of 47,000 PSI, a Knoop hardness of 1661 (300 gram load), and 43% lower volume loss than Diamonite P-85 $Al_2O_3$ in a SiC grit blast test.

EXAMPLE 2

A reactant powder mixture was prepared according to Example 1 above. The mixture was hot pressed for one hour under 500 mm Hg of Argon at 1600° C. and 4000 PSI. The desired reaction occurred during the heating to 1600° C. The resultant sintered ceramic had a strength of about 85,000 PSI, a Knoop hardness of 1600 (100 gram load), and 41% less volume loss than Diamonite P-85 $Al_2O_3$ in a SiC grit blast erosion test.

What is claimed is:

1. A dense ceramic composition consisting essentially of $Al_2O_3$, $B_4C$ and SiC in a mole ratio $Al_2O_3:B_4C:SiC$ of about 4:1:3.

2. The dense ceramic of claim 1 having a strength of at least about 85,000 psi and a knoop hardness of at least about 1600 measured with a 100 gram load.

3. A method for producing a dense material consisting essentially of $Al_2O_3$, $B_4C$ and SiC, said method comprising:
   (a) forming a mixture by combining $SiO_2$, $B_2O_3$ and Al powders and a carbon source selected from the group consisting of carbon powder and carbonizable binder,
   (b) compacting said mixture into a shape,
   (c) heating said shape whereby said shape reacts to form $Al_2O_3$, $B_4C$ and SiC by the reaction: $3SiO_2 + 2B_2O_3 + 8Al + 4C \rightarrow 4Al_2O_3 + B_4C + 3SiC$, and
   (d) densifying said reacted shape.

4. The method of claim 3 wherein said carbon source is carbon powder.

5. The method of claim 4 wherein said powders are combined in stoichiometric proportions according to said reaction of step (c).

6. The method of claim 3 wherein said densification is performed by hot pressing.

7. The method of claim 3 wherein said densification is performed by pressureless sintering.

8. The method of claim 4 wherein at least one of said powders is present in excess of stoichiometric proportions based on said reaction.

* * * * *